Dec. 28, 1965  E. A. WACHSMUTH  3,225,517
GAS DRYING METHOD
Filed Jan. 22, 1963
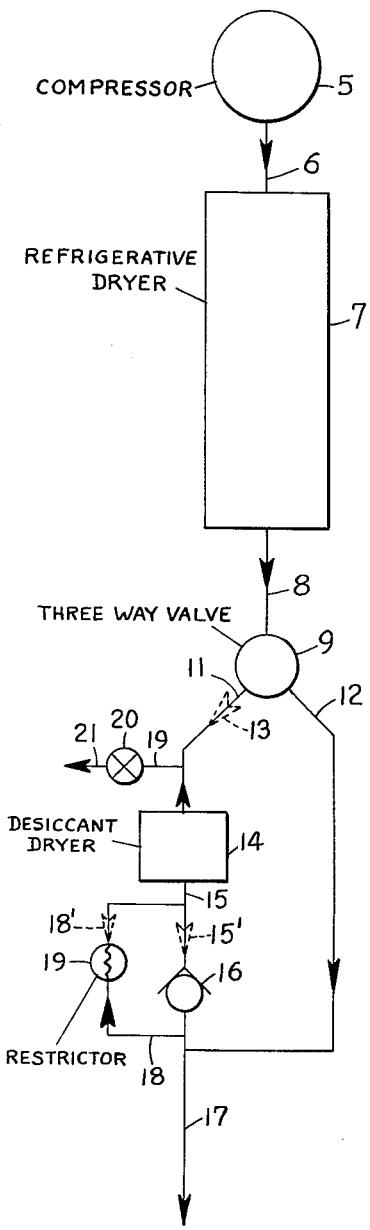
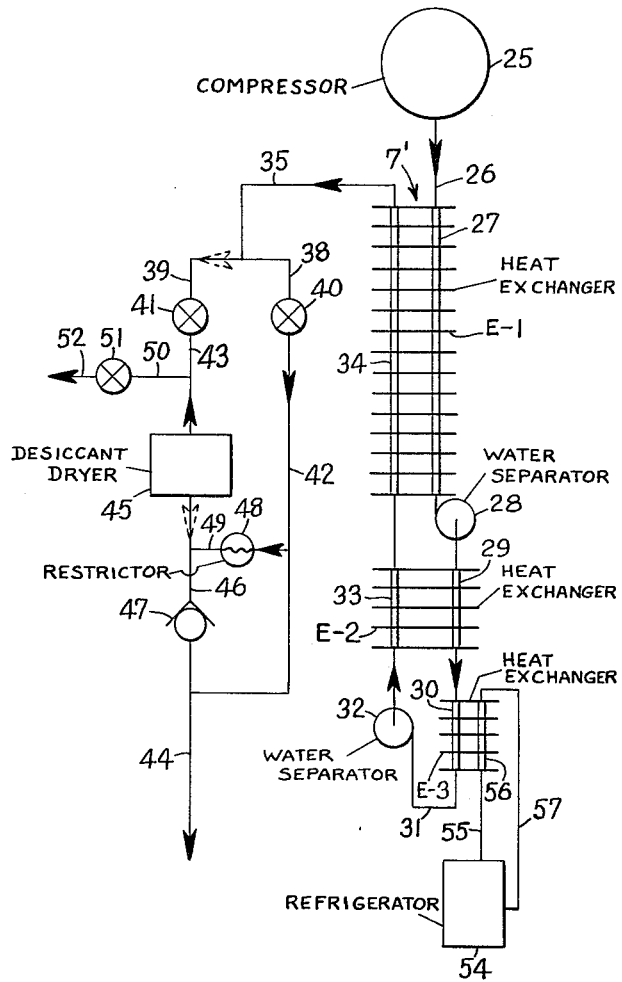
INVENTOR:
ERICH A. WACHSMUTH
BY
*E. Wallace Breisch*
ATTORNEY United States Patent Office 3,225,517
Patented Dec. 28, 1965

3,225,517
GAS DRYING METHOD
Erich A. Wachsmuth, Long Beach, Ind., assignor to Joy Manufacturing Company, Pittsburgh, Pa., a corporation of Pennsylvania
Filed Jan. 22, 1963, Ser. No. 253,091
5 Claims. (Cl. 55—31)

This invention relates to gas drying and more particularly to a method whereby desiccant drying and refrigerative drying are selectively applied to a stream of gas to remove water vapor therefrom.

In the field of gas handling and gas processing it is often necessary to greatly reduce the moisture content of a gas being used for a particular purpose. For example, compressed air used in the charging of instrument systems and pneumatic cylinders has a long term corrosive effect upon certain components of such apparatus if the dew point of the air inside the apparatus is higher than approximately minus 65° F. Another example is the icing of orifices, nozzles and passageways which occurs when the moisture content of the gas is too high and which may cause malfunction of regulators and similar equipment. Desiccant drying systems as well as refrigerative drying systems have been used successfully to achieve such moisture reduction but have not been satisfactory under all conditions of operation for the following reasons:

Refrigerative gas drying systems, making use of refrigeration and regenerative heat exchange to remove moisture from a stream of gas, require a substantial period of time after start up before the stream of gas reaches its design dew point because the heat exchanger system must be cooled down until it reaches operating equilibrium with the stream of gas at a temperature corresponding to the desired dew point.

Desiccant gas drying systems on the other hand have a zero start up time but are inefficient for extended periods of continuous operation because as the desiccant materials adsorb moisture they gradually lose the capability of adsorbing moisture and must be exchanged for fresh desiccant materials of unimpaired adsorption capability. The point at which such exchange should take place is difficult to determine and uncertainty as to the proper time of such an exchange often results in a too early exchange which is uneconomical or a too late exchange which can cause serious trouble because the design dew point of the process gas is not being attained and too much moisture is being left in the stream of gas.

The method of the instant invention contemplates the provision of a gas drying system in which desiccant drying is used during the start up time of a refrigerative drying system incorporated in the same apparatus and subsequently using the refrigerative drying system to dry the air during an extended period of operation. While the refrigerative drying system is being used a small portion of the dried air is bled off and reversedly applied to the desiccant drying system to remove the moisture collected therein during the start up period.

It is therefore an object of this invention to provide a new and improved gas drying method.

It is another object of this invention to provide a new and improved gas drying method for refrigerative drying and for desiccant drying selectively operable so that desiccant drying is applied only during the start up portion of an operating period.

It is a further object of this invention to provide a novel method of gas drying comprising a series of operations which apply desiccant drying to a stream of gas for immediate effective moisture removal during start up of a gas handling operation and refrigerative drying for a protracted period of time after the start up time has elapsed.

It is a more specific object of this invention to provide a new and improved method for drying a stream of gases which employs apparatus comprising a plurality of heat exchangers and water separators so connected that compressed gases flow through the heat exchangers seriatim in a cooling portion of the flow path within which moisture is removed from the stream of gases by the application of low temperatures, after which the gases returning through at least a portion of these heat exchangers absorb heat from the incoming gases before exiting to another part of the apparatus where desiccant drying is selectively applied during a start up period of the drying operation, at the end of the start up period the desiccant drying portion of the apparatus is blocked out of the circuit so that the drying is thereafter accomplished solely by refrigerative action.

These and other objects and advantages of this invention will become more apparent upon consideration of the following description and drawings in which:

FIG. 1 is a schematic representation of a gas drying system constructed according to the principles of this invention;

FIG. 2 is a schematic representation of a particular embodiment of the gas drying apparatus of this invention in which a refrigerative drying section is schematically detailed.

For purposes of illustration and description the apparatus and method of this invention will hereinafter be described as applied to the removal of water vapor from a stream of compressed air. Description in such terms should not be taken as limitative upon this invention since the principles herein embodied can be applied to removing water vapor or other condensable contaminants (any undesirable constituents of the stream) from other gases.

In FIG. 1 there is schematically represented a source of pressure fluid such as an air compressor 5 communicating by way of a fluid conducting line 6 with a refrigerative drying apparatus 7 characterized by needing a substantial period of time at the beginning of a drying operation during which the gases to be dried are passing through the refrigerator without being effectively dried. The refrigerative dryer 7 is further connected by a line 8 to a three way valve 9 which is selectively operable to connect the line 8 to either of two further lines 11 and 12 for a purpose hereinafter to be made plain. The line 11 communicates with a desiccant dryer 14 of a type well known in the art which contains desiccant materials for the removal of water vapor or other contaminants from any gases passing therethrough. Such desiccant materials may remove condensable contaminants from the gases by absorption, adsorption, chemical action or a combination of these effects provided only that such action is reversible by passing a stream of previously dried gas through the dryer 14. A second side of the desiccant dryer communicates through a line 15 with a check valve 16 positioned so that gases traveling through the desiccant dryer from the line 11 to the line 15 can pass onwardly through the check valve 16 to the delivery line 17 communicating therewith which connects the apparatus so far described with a point of use (not shown) for the air being dried by the device of this invention.

The fluid conducting line 12 communicates directly with the line 17, bypassing the desiccant dryer 14 and the check valve 16 as desired. A bypass line 18 containing a flow restrictor 19 communicates between the lines 17 and 15 to allow a restricted flow of gas to bypass the check valve 16 for a purpose hereinafter described. The fluid conducting line 11 also communicates through a branch line 22 with a valve 20 which when open communicates through a fluid conducting line 21 with the surrounding atmosphere or in the case of gases other than air being processed can communicate with the intake of the compressor 5.

Operation of the apparatus of FIG. 1 begins with start up of the compressor 5 to supply compressed air through the refrigerative dryer 7 and the line 8 to the three way valve 9. Since, however, the refrigerative dryer 7 is also being started at the same time and since the dryer 7 is characterized by needing a period of time to become operatively effective in drying the air, the valve 9 will be operated into a position where the line 8 is in communication through the valve 9 with the line 11. The compressed air flows through the line 11 as indicated by a dotted line arrow 13, through the desiccant dryer 14 where water vapor is removed from the compressed air which then passing outwardly from the dryer 14, through the line 15, as indicated by a dotted line arrow 15', passes through the check valve 16 and the line 17 to the point of use as desired. During the period of time during which the refrigerative dryer 7 is becoming effectively operative to dry the air passing therethrough, hereinafter designated the start up period, the compressed air continues to flow through the system in the manner described. It is to be noted that during start up period the valve 20 is closed and none of the compressed air flows through the lines 22 and 21. It is to be further noted that during the start up period a small amount of the compressed air flows through the line 18 from the line 15 to the line 17, as indicated by the arrow 18' on the line 18, but that such flow merely adds to the main volume of flow through the check valve 16 in the same direction so that at this time the restrictor has no significant effect upon the process.

When the refrigerative dryer 7 becomes fully effectively operative to dry the compressed air flowing therethrough, the start up period ends and the valve 9 is operated into a position establishing communication between the line 8 and the line 12, the line 11 being shut off and the valve 20 opened. This is the beginning of a normal operating period extending from the end of the start up period for as long as the supply of compressed air at the point of use is required. During normal operation the compressed air flows through the line 8, the valve 9 and the line 12 to the line 17 and the point of use except for a relatively small portion of the compressed air which entering the line 17 is bled off through the bypass line 18 and the restrictor 19 in the reverse direction from that shown by the arrow 18'. This small portion flows through the line 15, the desiccant dryer 14, a portion of the line 11, through the line 22, the valve 20 and the line 21 outward to the atmosphere or back to the intake of the compressor as desired. The flow of air through the desiccant dryer (in the reversed direction) from the line 15 to the line 11 is maintained at a low delivery rate by restrictor 19 for the purpose of drying out the desiccant materials in the dryer 14 and is effective in removing absorbed moisture therefrom because the refrigerant dryer 7 during the normal operating period is fully effective and the air passing through the line 17 has already been dried to the required extent necessary for the intended use.

After an extended period of normal operation, inspection of the air exiting from the line 21 will indicate that the desiccant materials in the dryer 14 are no longer giving up moisture indicating that the bypassing of air through the line 18 is no longer necessary. When the desiccant materials in the dryer 14 reach this condition the valve 20 is operated to a closed position so that all of the compressed air now flows through the valve 9, the line 12 and the line 17 to the point of use and continues to flow in this manner for the remaining part of the normal operating period.

In FIG. 2 there is schematically represented an air compressor 25 communicating through a fluid conducting line 26 with a passageway 27 in a heat exchanger E–1. The end of the passageway 27 remote from the compressor 25 communicates with a water separator 28, of a type well known in the art, in which water condensing from a stream of compressed air passing through the passageway 27 can be collected and drained off in a well known manner. The water separator 28 communicates with a passageway 29 in a second heat exchanger E–2 which further communicates with a passageway 30 in a third heat exchanger E–3. The passageway 30 communicates through a fluid conducting line 31 with a second separator 32 which in turn communicates with a second passageway 33 in the second heat exchanger E–2. The separator 32 is adapted to collect ice crystals during normal operation and to collect water during a start up period as hereinafter described. The passageway 33 communicates with a second passageway 34 in the first heat exchanger E–1 which in turn communicates with a fluid conducting line 35 with branches 38 and 39 communicating with a pair of manually operated valves 40 and 41, respectively. The branch 38 communicates through the valve 40, when open, with a fluid conducting line 42 which further communicates with a fluid conducting line 44 leading to a point of use for the compressed air. The branch line 39 communicates through the valve 41 and a fluid conducting line 43 with a desiccant dryer apparatus 45, which in turn communicates through a line 46 and a check valve 47 with the delivery line 44. At a point between the valve 41 and the desiccant dryer 45, the line 43 communicates with a branch line 50 and a valve 51 which further communicates with a line 52 leading to the atmosphere or back to the intake side of the compressor 25.

A suitable refrigerator 54, capable of an output of cold fluid, communicates through an output line 55 with a passageway 56 in the heat exchanger E–3 which in turn communicates with a line 57 communicating with the inlet side of the refrigerator 54. The refrigerator 54 is of course any device capable of producing an external circulating fluid, cooled to the requisite temperature for the drying operation of this apparatus.

Operation of the device schematically represented in FIG. 2 begins with the start up of the compressor 25 to force compressed air through the line 26, the passageway 27, the water separator 28 and the passageways 29 and 30. At the same time the refrigerator 54 is started up and furnishes cold fluid through the line 55 to the passageway 56 of the heat exchanger E–3. The compressed air in the passageway 30 being in heat exchange relationship with the passageway 56 gives up some of its heat to the cold fluid in the passageway 56 before exiting from the passageway 30 through the line 31 and the separator 32 into the passageway 33. The cooled compressed air in the passageway 33 being in heat exchange communication with the passageway 29 absorbs some of the heat from the compressed air in the passageway 29 and progressing upwardly from the passageway 33 into the passageway 34 in heat exchange communication with the passageway 27 of the heat exchanger E–1 absorbs a further portion of heat from the compressed air in the passageway 27 before exiting from the passageway 34 to the line 35.

During a start up portion of the operation of this device the refrigerator 54 is unable to produce effective drying of the compressed air because the temperature of the heat exchangers E–1, E–2 and E–3 cannot be instantaneously reduced to the levels necessary for effective drying, that is, freeze out of the moisture remaining in the air stream after passing separator 28, as hereinafter described. During the start up period the valve 40 is closed and the valve 41 is open so that compressed air from the line 35 flows through the line 39, the valve 41, the line 43, the desiccant dryer 45, the line 46, the check valve 47 and the line 44 to the point of use. At the beginning of the start up period the desiccant dryer 45 is the effective means of removing water vapor from the air as desired, but as the operation continues a regenerative refrigerative dryer 7' (hereinafter defined) assumes an ever greater portion of the drying action.

The heat exchangers E–1, E–2 and E–3 together with the water separators 28 and 32 and the refrigerator 54 constitute the particular regenerative refrigerative dryer 7' substituted for the more generally described refrigerative dryer 7 of FIG. 1. During the start up period the refrigerative dryer 7' continues to operate with the heat exchange relationships as outlined above until operating temperatures are reached and an operating equilibrium established therein. For a particular operation a dew point of —65° F. at a pressure of one atmosphere is desired in the product air and the operation of the refrigerative dryer 7' will be described in relation to such requirement. The compressed air flowing in through the passageway 27 being cooled by the outgoing compressed air in the passageway 34, as hereinbefore described, passes through the water separator 28 and is further cooled in the passageway 29 before reaching the passageway 30 of the heat exchanger E–3 where true refrigerative cooling takes place. The cooling of the incoming compressed air in the exchangers E–1 and E–2 is of a regenerative type well known in the art and will not be further described. At the end of the start up period the temperature in the stream of compressed air will approach the solidification temperature of the condensate (34° F. for water vapor at moderate pressure) at the outlet end of passageway 27 and in the water separator 28. This temperature is designed into the heat exchanger E–1 as the lowest usable without danger of freezing the condensed water vapor and is used to separate the maximum amount of water vapor from the compressed air before freezing takes place. As the compressed air progresses onward through the passageways 29 and 30 its temperature is progressively reduced reaching a low temperature corresponding to a dew point of —65° F. as it exits from the passageway 30 into the line 31. Such temperature reduction causes further condensation of the water vapor in the compressed air but, since such condensation is taking place at a temperature below the solidification point of the condensate the condensed moisture takes the form of frost particles which gather on the sides of the passageways 29 and 30 and in the separator 32. Since there is only a small amount of water vapor left in the air after passing through the water separator 28 at the temperature 34° F. it is possible to design the passageways 29 and 30 to accommodate the frost formed from the compressed air passing through the passageways over an extended period of operation, in one case as much as 70 hours.

When the temperature of the compressed air in the line 31 has been reduced to the required degree, normal operation will have been attained and the air exiting from the refrigerative dryer 7' through the line 35 is now diverted through branch line 38 by the opening of valve 40 and the closing of valve 41. Progressing through the valve 40 and the line 42 the main flow of compressed air passes into the line 44 and to the point of use. The line 42 also communicates with a line 49 having a flow restricting device 48 therein and further communicating with the line 46 so that when, during an early part of the period of normal operation, the valve 51 is opened a small portion of the compressed air flowing through the line 42 is diverted through the line 49, the line 46, the desiccant dryer 45, the line 43 and the line 50 to pass outwardly through the valve 51 and the line 52 to the atmosphere or back to the intake side of the compressor as desired. This relatively small flow of air is used as described in the operation of the apparatus of FIG. 1 to dry the desiccant materials in the desiccant dryer 45. After such drying is completed the valve 50 is closed and all of the compressed air flowing through the line 42 goes directly to the line 44 and the point of use.

It is to be realized that other valve arrangements can be used to accomplish the above described gas flow without departing from the scope of this invention.

After an extended period of use as for example 12 hours the operation is stopped while the separator 32 and the heat exchangers E–2 and E–3 are allowed to warm up resulting in melting of the accumulated frost therein. During the start up portion of the next period of operation the accumulated liquid in the passageways 29 and 30 passes through the line 31 and is trapped in the water separator 32 to be disposed of in the usual manner. All other action during the start up period being the same as hereinbefore described normal operation is achieved in the same manner.

Having described preferred embodiments of this invention in accordance with the Patent Statutes, it is to be realized that modifications thereof may be made without departing from the broad spirit of this invention. Accordingly, it is respectfully requested that this invention be interpreted as broadly as possible and be limited only by the prior art.

What is claimed is:

1. The method of removing entrained condensable contaminants from a stream of gas comprising the steps of: passing a stream of gas through a regenerative refrigerative purifying means and through a desiccant purifying means seriatim at the beginning of a purifying operation while simultaneously cooling such refrigerative means to an effective operating temperature; discontinuing the passage of such stream through said desiccant means or any other desiccant purifying means as soon as said refrigerative means has reached said operating temperature while continuing the passage of such stream through said regenerative refrigerative means.

2. The method of removing entrained condensable contaminants from a stream of gas comprising the steps of: passing a stream of gas through a regenerative refrigerative purifying means and through a desiccant purifying means seriatim at the beginning of a purifying operation while simultaneously cooling such refrigerative means to an effective operating temperature; discontinuing the passage of such stream through said desiccant means or any other desiccant purifying means as soon as said refrigerative means has reached said operating temperature while continuing the passage of such stream through said regenerative refrigerative means and through by-pass means connected parallel to said desiccant purifying means; bleeding off a portion of such fluid stream from said by-pass means; and passing said portion reversedly through said desiccant purifying means.

3. The gas purifying method applied to a stream of gas having condensable contaminants entrained therein comprising the steps of: passing said stream of gas through refrigerative purifying means; passing said stream of gas through selectively operable valve means to direct said gas stream into either of two paths; selectively operating said valve means to direct said stream of gases along a first path through a desiccant purifying means to a point of use of purified gas throughout a start up period of time during which said refrigerative means is being cooled down to a temperature sufficiently low to remove said condensable contaminants; operating said valve means at the end of said start up period to cut off the flow of gas along said first path and direct said gas stream along a second path through gas conducting means by-passing said desiccant purifying means to said point of use of purified gas.

4. The gas purifying method applied to a stream of gas having condensable contaminants entrained therein comprising the steps of: passing said stream of gas through refrigerative purifying means; passing said stream of gas through selectively operable valve means to direct said gas stream into either of two paths; selectively operating said valve means to direct said stream of gases along a first path through a desiccant purifying means to a point of use of purified gas throughout a start up period of time during which said refrigerative means is being cooled down to a temperature sufficiently low to remove said condensable contaminants; operating said valve means at the end of said start up period to cut off the flow of gas along said first path and direct said gas stream along a second path through gas conducting means by-passing said desiccant purifying means to said point of use of purified gas; bleeding off a small controlled portion of said gas stream from said gas conducting means; and passing said portion reversedly through said desiccant purifying means and through an outlet valve means whereby contaminants are removed from within said desiccant purifying means.

5. The gas drying method applied to a stream of gas having water vapor entrained therein comprising the steps of: passing said stream of gas through refrigerative drying means; passing said stream of gas through selectively operable valve means to direct said gas stream into either of two paths; selectively operating said valve means to direct said stream of gases along a first path through a desiccant drying means to a point of use of dried gas throughout a start up period of time during which said refrigerative means is being cooled down to a temperature sufficiently low to remove said water vapor from said stream; operating said valve means at the end of said start up period to cut off the flow of gas along said first path and direct said gas stream along a second path through gas conducting means by-passing said desiccant drying means to said point of use of dried gas; bleeding off a small controlled portion of said gas stream from said gas conducting means; passing said portion reversedly through said desiccant drying means and through an outlet valve means whereby water is removed from within said desiccant drying means.

References Cited by the Examiner

UNITED STATES PATENTS 2,747,681   5/1956   Schuftan et al. ____ 55—62 X

REUBEN FRIEDMAN, *Primary Examiner.*